(12) United States Patent
Vartiainen et al.

(10) Patent No.: US 12,521,916 B2
(45) Date of Patent: Jan. 13, 2026

(54) MANUFACTURING METHOD OF MASTER TEMPLATE AND STAMP OF GRATING OF DIFFRACTIVE OPTIC ELEMENT, MASTER TEMPLATE AND STAMP

(71) Applicant: DISPELIX OY, Espoo (FI)

(72) Inventors: Ismo Vartiainen, Espoo (FI); Mikhail Erdmanis, Espoo (FI)

(73) Assignee: DISPELIX OY (FI)

( * ) Notice: Subject to any disclaimer, the term of this patent is extended or adjusted under 35 U.S.C. 154(b) by 247 days.

(21) Appl. No.: 18/258,294

(22) PCT Filed: Dec. 20, 2021

(86) PCT No.: PCT/FI2021/050894
§ 371 (c)(1),
(2) Date: Jun. 19, 2023

(87) PCT Pub. No.: WO2022/136733
PCT Pub. Date: Jun. 30, 2022

(65) Prior Publication Data
US 2024/0051190 A1    Feb. 15, 2024

(30) Foreign Application Priority Data
Dec. 22, 2020 (FI) .................................... 20206364

(51) Int. Cl.
| B29C 33/38 | (2006.01) |
| B29D 11/00 | (2006.01) |
| G02B 5/18 | (2006.01) |

(52) U.S. Cl.
CPC .... *B29C 33/3878* (2013.01); *B29D 11/00769* (2013.01); *G02B 5/1847* (2013.01)

(58) Field of Classification Search
CPC .. B29C 33/3878; B29D 1/1847; G02B 5/1847
See application file for complete search history.

(56) References Cited

U.S. PATENT DOCUMENTS

| 1,082,388 A | 12/1913 | Ainsworth |
| 5,659,562 A | 8/1997 | Hisa |
(Continued)

FOREIGN PATENT DOCUMENTS

| FI | 20205642 A1 | 12/2021 |
| WO | 2020185954 A1 | 9/2020 |

OTHER PUBLICATIONS

Mattelin, M.A., et al. Design and fabrication of blazed gratings for a waveguide-type mounted disply. In: Optics Express, Apr. 2020, vol. 28, pp. 11175, 11190.

*Primary Examiner* — Mathieu D Vargot
(74) *Attorney, Agent, or Firm* — Edmonds & Cmaidalka, P.C.

(57) ABSTRACT

A manufacturing method of a master template (20) of a grating of a diffractive optic element. A layer (250) of material (200) is deposited on a substrate (108) of the master template (180) through perforations (204) of a plate (202), cross sectional areas of the perforations (204) depending on locations of the perforations (204) in the plate (202), and the plate (202) and the substrate (108) being spaced at a non-zero distance (D) from each other. Height of the at least one layer (250) on the substrate (108) is caused to vary with variation of the areas of the perforations (204). Raised formations (180) are formed on the substrate (108) by removing the at least one layer (250) from areas, which result in lowered formations (182) between the raised formations (180). A fill factor and height of the raised formations (180) are made to be proportional with each other while the raised and lowered formations (180, 182) have a relation with grooves (902) and ridges (900) of the grating (904), the relation depending on the proportionality.

11 Claims, 6 Drawing Sheets

(56) References Cited

U.S. PATENT DOCUMENTS

| | | | |
|---|---|---|---|
| 5,784,507 | A | 7/1998 | Holm-Kennedy |
| 10,527,865 | B2 * | 1/2020 | Yang .................. G02B 27/0172 |
| 2015/0355394 | A1 | 12/2015 | Valera et al. |
| 2016/0033697 | A1 | 2/2016 | Sainiemi |
| 2018/0052320 | A1 | 2/2018 | Curtis |
| 2018/0107110 | A1 | 4/2018 | Vikramjit |
| 2019/0137777 | A1 | 5/2019 | Yang et al. |
| 2019/0324176 | A1 | 10/2019 | Colburn |
| 2020/0110205 | A1 | 4/2020 | Rahomaki |
| 2020/0110278 | A1 | 4/2020 | Yang et al. |
| 2020/0192009 | A1 | 6/2020 | Evans |
| 2020/0271850 | A1 | 8/2020 | Vora et al. |
| 2020/0301062 | A1 | 9/2020 | Young et al. |
| 2020/0363719 | A1 | 11/2020 | Labonte |

* cited by examiner

MANUFACTURING METHOD OF MASTER TEMPLATE AND STAMP OF GRATING OF DIFFRACTIVE OPTIC ELEMENT, MASTER TEMPLATE AND STAMP

FIELD

The invention relates to a manufacturing method of a master template and stamp of a grating of a diffractive optic element, the master template and the stamp.

BACKGROUND

A diffractive optic element (DOE)-based optical combiner for augmented reality (AR) eyewear typically comprises nanostructures such as gratings. In order to optimize the optical performance of the optical combiner, modulations in the nanostructures are required. These modulations can be feature shape modulations, feature size modulations, or height modulations. All these can be used in order to achieve the optimal design parameters for the optical combiner.

In the replication process, the goal is to copy the DOE pattern on the master template to another wafer. The replication can be done into a permanent layer that then acts as the optical element. In the first case, the modulations nanostructures of the master template are directly transferred to the permanent layer. In case modulations such as shape, feature size and/or height modulations are required, they need to be present in the master template.

If the pattern is transferred from initial patterned sacrificial layer to the permanent layer(s) deposited on the wafer, the height modulations in the final layers can be done in the deposition phase. The sacrificial layer may be deposited by spin coating, for example, resulting in a uniform film thickness over the wafer. However, in case feature shape or feature size modulation in required, one has to consider different volumes that different feature sizes require in order to fill the structures completely. This results in variation of the thickness of the unstructured layer below the actual structures. This makes the pattern transfer process significantly difficult or in some cases completely impossible. In order to compensate for the different volume requirements of different feature sizes, one has two options: i) addition of local reservoirs in the master pattern to consume the extra volume of the sacrificial material, ii) modulating the height of different feature sizes in the master to compensate the volume differences. The first one can have negative effect to the performance of the optical combiner, and therefore the latter one is recommended. However, selection of this latter alternative adds significantly complexity for manufacturing the master template such as repeating a lithographic and etching process a plurality of times, which in turn may have negative effects on the yield in the mastering process as all additional process steps have a yield below 100%. In addition, every additional process step increases the risk of lowering the overall master quality by increasing contamination and undesired particles.

Hence, an improvement would be welcome.

BRIEF DESCRIPTION

The present invention seeks to provide an improvement related to the master template and stamp used in the manufacturing process of nanostructures of the DOE.

The invention is defined by the independent claims. Embodiments are defined in the dependent claims.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

In this document, a concept of a height modulated master template, a stamp based on the master template and their manufacturing methods are proposed. The master template refers to an imprint master template. A fine pattern corresponding to that of the grating is on a surface the master template. The stamp also has a fine pattern on its surface for manufacturing the diffractive optic element according to an imprinting method, for example (see FIG. 9A to 9D). The fine pattern of the stamp corresponds to that of the grating and the master template, the fine pattern of the stamp having the tone reversed with respect to that of the master template or vice versa. The diffractive optic element may have various applications. In an embodiment, the master template is manufactured first and the stamp is then replicated based on the master template. In an embodiment, the stamp is directly manufactured without the master template. The method allows for deposition of a custom pre-defined thickness profiles that define the height modulation map of the structures of the master template and the stamp.

In this document, the master template refers to a template that is a model for the stamp and the stamp is made based on the master template. So at first, the master template is produced and then a stamp may be produced. The stamp is used in the manufacturing process of the grating of the optic element. However, also the master template may be used in the manufacturing process of the grating of the optic element. Hence, the master template may also be considered a stamp in such a case.

The method of manufacturing the master plate consists of two main steps: i) deposition of a pre-designed height map utilizing a plate 202, which may be called a shadow mask and ii) patterning of the aforementioned layer resulting in a controllable in-plane master pattern with a pre-defined height. The deposition of the height gradient is performed by specially perforated pattern where ratios between mask openings i.e. perforations 204 and solid mask material can vary along X-direction and/or Y-direction, and additionally a special holder i.e. a spacer structure 206 that provides specific distance between the plate 202 and a substrate 108 (see FIG. 3)

Figure 1A:
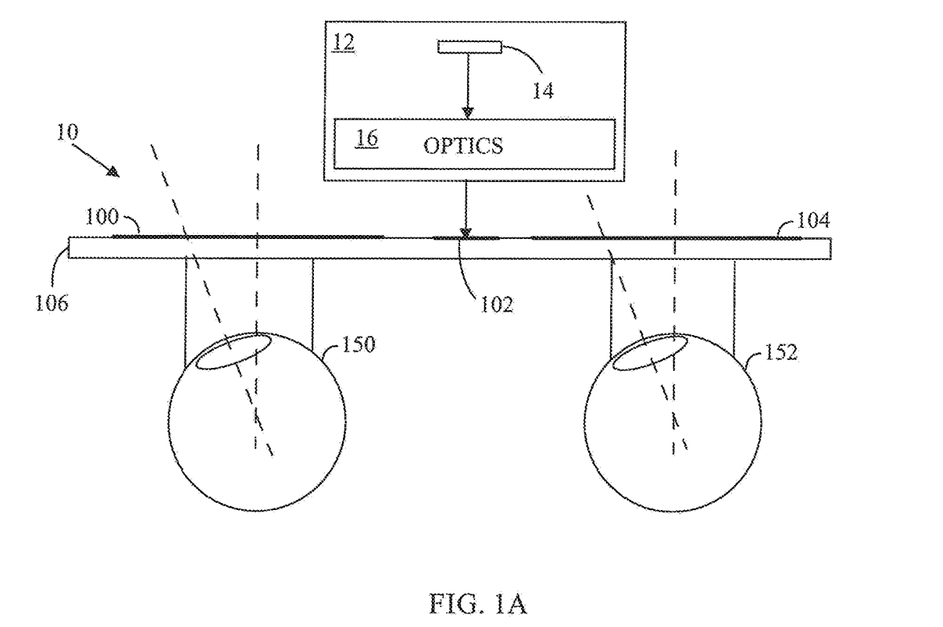
FIGS. 1A and 1B illustrate examples of an AR eyewear.
Figure 1B:
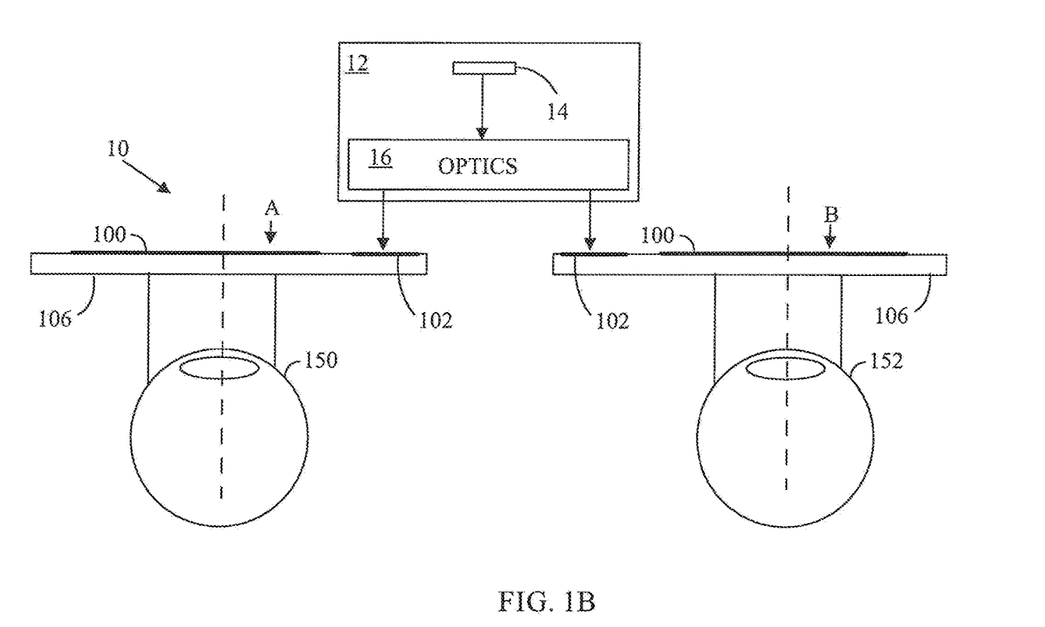

FIGS. 1A and 1B illustrate examples of an AR (Augmented Reality) eyewear where the diffractive optic element can be applied. However, the diffractive optic element may more generally be used in any screen through which one can also see the environment in addition to the information delivered by the grating(s). In general, the diffractive optic element may also be applied outside the AR applications where light or image is coupled into and/or out of a waveguide/lightguide. The diffractive optic element can be applied in the AR, virtual reality (VR) and/or mixed reality (MR) applications. The diffractive optic element can also be applied in the home, leisure time and/or industrial AR, VR or MR. Examples of such are screens of computers tablets and/or hand-held electronic devices, and screens/windscreens of land vehicles (such as cars, busses, lorries, trucks), aircrafts (such as aeroplanes, helicopters, gliders, dirigibles), and/or marine vessels (such as boats, ships, sub-marines) or the like.

The eyewear may look like glasses, spectacles or goggles, for example. In an embodiment, the eyewear may be in connection with a headwear like a cap, a hat, a helmet or spectacles, for example. Although FIGS. 1A and 1B illustrate the AR eyewear for both eyes of a user, the AR eyewear may have a structure and may be used for one eye only.

In FIG. 1A, the eyewear comprises an optical element 10 with at least one grating 100, 102, 104 and an image generating unit 12, which in turn may have an image source 14 and an optic component arrangement 16. The optical element may be an example of the diffractive optic element that can be made with the stamp. The image generating unit 12 generates visible light of an image (still or video) that is coupled to a waveguide 106 of visible light through the optic component arrangement 16 and a diffractive grating 102, which is on a surface of the waveguide 106. In FIG. 1B, the waveguide 106 comprises two parts A and B, each for one eye 150, 152. The image generating unit 12 may direct the visible light of the image to the optic component arrangement 16, which may split the light for the two parts A and B. Instead of optical splitting, the eyewear may have two image generating units 12, each for one part A and B.

The diffractive gratings 100 to 104 may be on either side of the waveguide 106 in an embodiment. In an embodiment, at least one of the diffractive gratings 100 to 104 may be on a side of the waveguide 106 opposite to at least one other of them.

Figure 2:
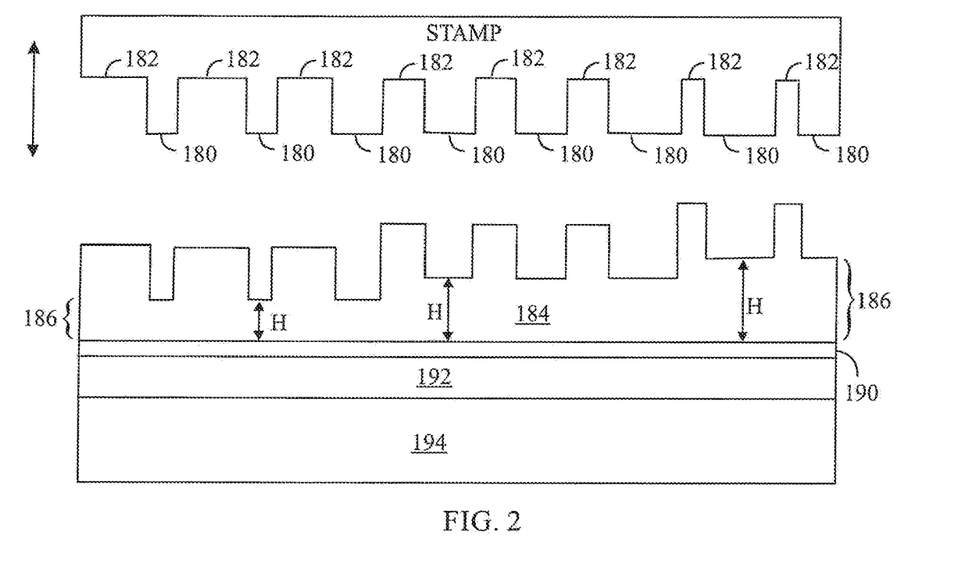
FIG. 2 illustrates an example the prior art press process.

FIG. 2 illustrates an example of a problem related to the prior art in addition to that explained in Background of this document. A stamp has raised formations 180 and lowered formations 182, and height of the raised formations 180 is constant although a fill factor varies in this example. All the lowered formations 182 are substantially at the same level. That is, the feature of the stamp is thicker at the raised formations 180 than at the lowered formations 182. The local fill factor F of the stamp can be determined as a ratio between the width of the feature lw and the period d, F=lw/d. The persons skilled in the art use a corresponding term when referring to gratings, which makes the term fill factor useful and familiar.

FIG. 2 can also be used to explain what the stamp is and what it is used for. The surface profile of the stamp is replicated to a polymer 184 such as resin by forming a tone inverted pattern compared to the stamp. The replication process may be considered an inverse replication process which may be an imprint process where the tone is reversed.

The resin may be on a hardmask 190, which in turn is on the grating material 192. Finally the grating material 192 is on a lightguide 194. Height H of a residual layer 186 of the polymer 184 is not constant but varies. The inverse process may be an imprinting process in which the stamp is pressed against the polymer 184 such that the polymer 184 flows into the lowered formations 184 between the raised formations 180 of the stamp. When the stamp is disconnected from the polymer 184, the polymer 184 has a surface profile which resembles an inverse surface profile of the stamp but is actually not quite that. Namely, the variation of the height H of the residual layer 186 is caused by varying volumes occupied the polymer 184 inside the lowered formations 182 of the stamp. The variation of the thickness of the unstructured layer i.e. the residual layer 186 makes the pattern transfer process significantly difficult or perhaps completely impossible. The hardmask 190 may comprise chromium (Cr) or chromium oxide ($Cr_2O_3$), for example, without limiting to these.

Figure 3:
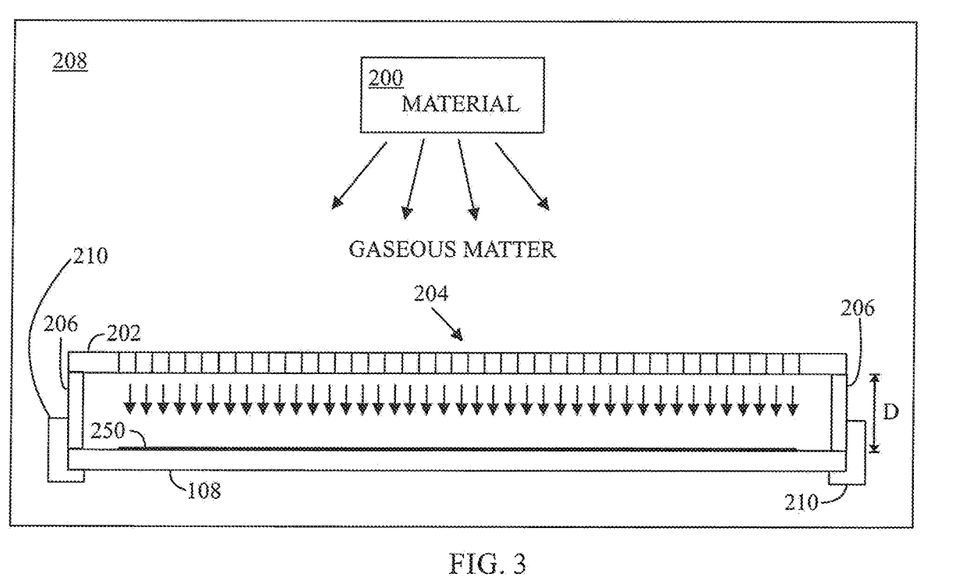
FIG. 3 illustrates an example of a deposition process.

FIG. 3 illustrates an example of a deposition process, which can be used to form a surface profile of the master template 20 or the stamp 22 in order to alleviate or eliminate the variation of the thickness of the unstructured layer i.e. the residual layer 186 during the inverse replication process.

Material 200 is deposited as a layer 250 onto a substrate 108 through perforations 204 of a plate 202. The surface profile of the master template 20 i.e. the surface profile of the layer 250 may after the deposition be directly or indirectly used to form at least one diffractive grating 100, 102, 104 of the eye wear. The plate 202 is set at a non-zero distance D from the substrate 108. The distance D may be set using a spacer structure 206, for example. The plate 202 may be supported by the spacer structure 206. If a shape of the substrate 108 is a circle, the spacer structure 206 may be a ring that is around an outer contour of the substrate 108.

In an embodiment, the non-zero distance D between the plate 202 and the substrate 108 may be adapted.

A total thickness of the structure including the spacer structure 206 may have a thickness larger than the distance D. The spacer structure 206 may have a circular outer circumference and an inner side with a circular opening, rectangular opening(s) and/or other custom-shaped openings that support positioning of the plate 202 above the substrate 108 and screen other areas from getting material 200 deposited thereon. Hence, the spacer structure 206 may have a thickness equal to the distance D. A material of the spacer structure 206 may comprise metal, glass, ceramic or the like for example. In an embodiment, the spacer structure 206 may comprise anodized aluminum, for example.

In an embodiment, the spacer structure 206 may comprise at least one adjustment arrangement 210. The adjustment arrangement 210 may be mechanical, electro-mechanical, hydraulic and/or pneumatic, for example. A mechanical adjustment arrangement may comprise a screw, for example. An electro-mechanical adjustment arrangement may comprise an electric motor and a screw that is rotated by the electric motor, for example.

The distance D is a parameter that may be taken into account depending on the following: a) type of deposition reactor, nature and parameters of deposition process; b) thickness of the plate 202; c) feature size including height and/or width of the perforations 204 and structure of the perforations 204 in the plate 202. Additionally, the distance D may depend on d) a particular DOE layout that the master template 20 is directly or indirectly used to reproduce; e) arrangement of DOEs on the substrate 108 that the master template 20 is directly or indirectly used to reproduce. Here the DOE layout means that different grating shapes which are possible and which depend on the particular shape (e.g., rectangular, bowtie, triangle, etc.) may require different arrangements of the perforations 204 in the plate 202. Arrangement of the DOEs implies that there are different options depending on how e.g. several DOE with varying heights are positioned with respect to each other in order to adjust or control the height profile of the layer 250. The DOE layout, a layout of the master template 20 and a layout of the stamp 22 depend on and have a deterministic relation with each other.

The distance D between the plate 202 and the substrate 108 may be set to a specific optimal value. In an embodiment, the distance D may be about 5 mm, for example. If the distance D is too small, features of the perforations 204 may not even out sufficiently and the structure of the layer 250 may fail to be conformal enough. If the distance D is too large, the accuracy of a local film thickness control may degrade. In an embodiment, the plate 202 may be tilted with respect to the substrate 108.

In an embodiment, the distance D between the plate 202 and the substrate 108 may depend on the areas of the perforations 204 of the plate 202. In an embodiment, the distance D between the plate 202 and the substrate 108 may depend on the smallest areas of the perforations 204 of the plate 202.

In an embodiment, the distance D may be the shorter the smaller the area of the perforations 204 of the plate 202 is. In an embodiment, the distance D may be the shorter the smaller an average, maximum and/or minimum area of the perforations 204 of the plate 202 is. Correspondingly, the distance D may be the longer the larger the area of the perforations 204 of the plate 202 is. In this manner, the material 200 may spread also to the areas of the substrate 108 that are not directly overlapping or facing the perforations 204. Such a spread, in turn, results in an at least approximately uniform or at least fairly/reasonably flat layer 250 of the material 200 on the substrate 108.

In an embodiment, the spacer structure 206 may also include additional elements that are case-specific and are not shown in the drawings. These elements may be: a) additional features supporting the plate 202, b) additional features used to screen areas of the substrate 208, the areas corresponding to areas of the fabricated DOE (or around DOE) where material should not be deposited.

The material of the plate 202 may comprise metal, glass, ceramic or the like, for example. In an embodiment, the metal may be stainless steel that may be of a high purity, for example. In an embodiment, a thickness of the plate 202 may between about 0.001 mm to about 1 mm, for example. In an embodiment, a typical thickness may be about 0.01 mm to about 0.1 mm, for example. In an example, the thickness may be about 0.05 mm.

In an embodiment, a diameter of the substrate 108 and the plate 202 may vary from tens of millimeters to 450 mm, for example. In an embodiment, a diameter of the substrate 108 and the plate 202 may be about 100 mm, for example. The deposition system 208 may be scaled/modified or scalable for the substrates 108 of smaller/larger diameter.

Figure 4A:
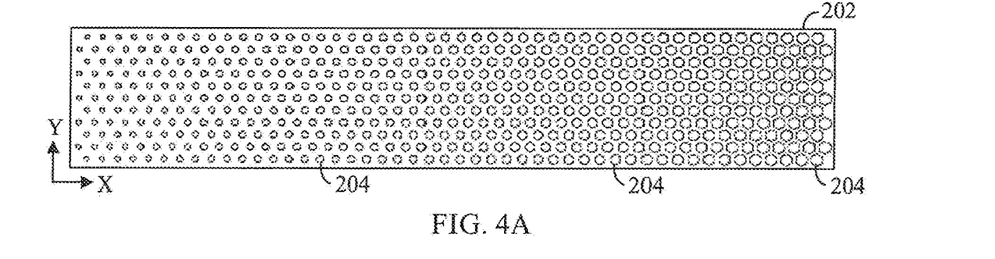
FIG. 4A illustrates an example of a plate with perforations.

As shown in an example of FIG. 4A, an area of the perforations 204 vary in a determined manner depending on a location in the plate 202 (only a few of the perforations have reference number in FIG. 4A because all the perforations cannot be marked with numbers). The area of the perforations 204 refers to a cross sectional area, a normal of which is parallel to the longitudinal axis of the perforation through the plate 202 and a normal of a surface of the plate 202. In the example of FIG. 4A, the area of the perforations 204 varies in the direction of X-axis but keeps constant in the direction of Y-axis. In an embodiment, the area of the perforations 204 may vary in both X-direction and Y-direction. In an embodiment, the area of the perforations 204 may vary only either in both X-direction or Y-direction. The dimensions, each of which can be considered a spatial extent orthogonal to and/or independent from another dimension, may be those of a Cartesian coordinate system or a polar coordinate system.

FIG. 4A shows an example of perforation and modulation of areas of the perforation 204 in the X-direction. Shapes of the perforations 204 may be: hexagonal, circular, rectangular, linear, star, any combination of these, for example, without limiting to these. The shapes of the perforations 204 may also be custom-made.

The plate 202 with the perforations 204 can be made to fulfil a desired opening-to-solid area ratio or a fill factor in the X-direction, the X- and Y-directions.

In an embodiment, the solid material 200 may be turned into a flowable state, which may be a gaseous state or a vapor state, in order to allow its passing through the perforations 204 of the plate 202. Then the material 200 in the flowable state solidifies as the layer 250 on the substrate 108.

In an embodiment, the material transfer for deposition onto the substrate 108 may be performed in a vaporized state, for example. Then the solid material 200 may be turned into a vapor state and the vapor is condensed as the layer 250, which may be a film structure, on the substrate 108 in a vapor deposition process, for example. The vapor deposition may be realized using sputtering, chemical vapor deposition or physical vapor deposition, for example, without limiting to these.

A person skilled in the art is familiar with various deposition systems and processes that can be used as the deposition system 208. The solid material 200 may be freely selected. Examples of the solid material 200 may be silicon, silicon dioxide, silicon nitride or aluminum, for example, without limiting to these. For example, the substrate 108 may be covered with the hardmask 190 or an etch stop layer, a purpose of which is to stop the etching process of the layer 250 at the surface of the hardmask 190 and protect of the substrate 108 from etching when the layer 250 of the solid material 200 is etched through at lowered formations 182 (see FIGS. 4B, 4C and 5).

Figure 4B:
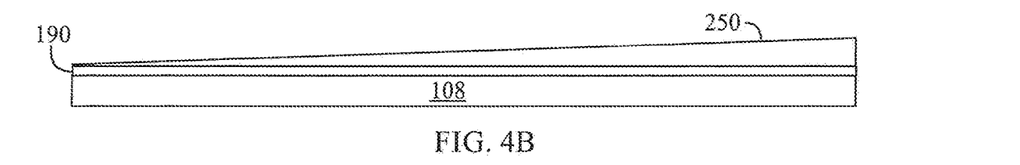
FIG. 4B illustrates an example of a layer of solid material deposited onto a substrate through the plate having perforations.

FIG. 4B shows an example of how a perforated pattern of the plate 202 may be transformed into a specific height profile of the layer 250 of material 200 on the substrate 108. The distribution of the material 200 in the layer 250 may be linear as in this example, or it may follow any shape such as that of a non-linear function depending on the distribution of sizes of the perforations 204 of the plate 202.

The unit cell of features in the plate 202 should be small enough to provide high control of local thickness and good uniformity of the layer 250. As the minimum feature size is limited among other factors by a thickness of the plate 202 and a perforation technique, thin masks such as 0.1 mm and below may be generally favorable. A required resolution of features of the plate 202 and a thickness of the plate 202 are dependent on the particular layout of the master template 20, the stamp 22 and/or the fabricated DOE.

Figure 4C:
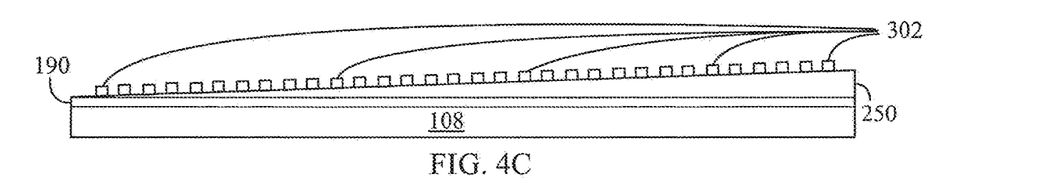
FIG. 4C illustrates an example of a patterned resist or etching mask on the layer.

FIG. 4C illustrates an example of a patterned resist or an etching mask layer 302 on the layer 250 of material 200. The layer 250 of material 200 may then be etched in order to form features including raised formations 180 and the lowered formations 182 (see also FIGS. 5, 6 and 7). In an embodiment, the etching may include dry etching. Instead of etching, the features of the master template 20 or the stamp 22 may be formed by laser ablation or any other suitable prior art patterning method, for example.

Figure 5:
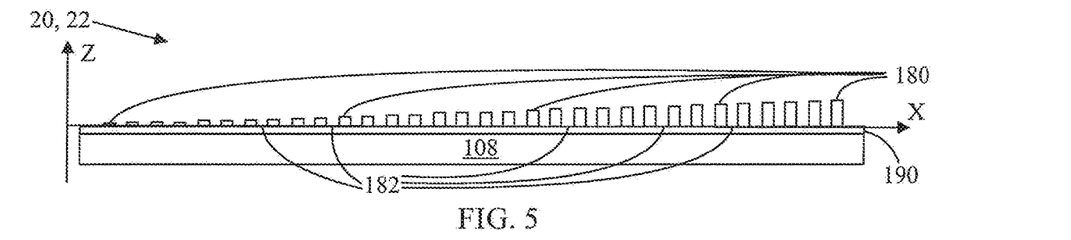
FIG. 5 illustrates an example of a distribution of raised formations on the substrate.

As shown in an example of FIG. 5, the raised formations 180 and lowered formations 182 of the master template 20 or the stamp 22 are thus made of the layer 250 of the solid material 200, and their fill factor and height follows that of the etching mask layer 302. A material removal device, which may as explained above include etching device or any other suitable prior art material removal device, may remove the solid material 200 of the layer 250 from locations of the lowered formations 182 and keep the solid material 200 of the layer 250 at locations of the raise formations 180. The horizontal axis X denotes a location in one direction and the vertical axis denotes a height H. Both axes are in an arbitrary scale.

Figure 6:
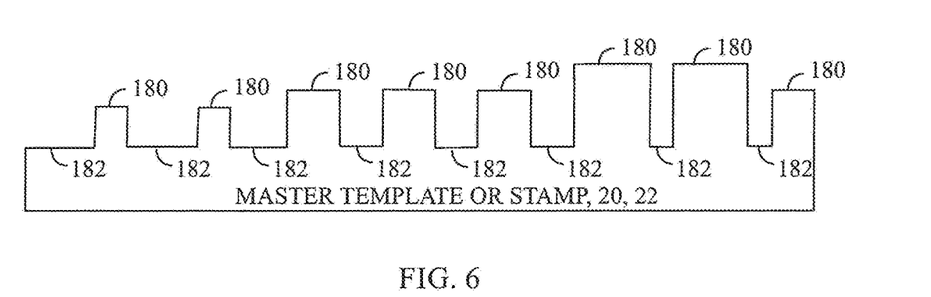
FIG. 6 illustrates an example of a master template or a stamp with a fill factor and height of raised formations that are directly proportional with each other.

FIG. 6 illustrates an example of the master template 20 made in the process illustrated in FIGS. 3 to 5. This master template 20 may be used as the stamp 22 or the master template 20 may be reproduced in order to make the stamp 22. Using the inverse reproduction process, the master template 20 needs to be copied an even number of times in order to have the master template 20 or the stamp 22 which has the fill factor and the height of the raised formations 180 to be directly proportional with each other.

In an embodiment, two different fill factors may not always need to have different heights of the raised formations 180 and vice versa. However, there is at least two different fill factor ranges which have different heights of the raised formations 180 while at least one of the fill factor ranges has only one height of the raised formations 180. In that manner, different fill factor ranges have different heights of the raised formations 180, although there may be a single fill factor range within which the height of the raised formations 180 is constant. Here, any fill factor range is a part of the full scale of the fill factors of the master, the stamp and/or the grating.

Figure 7:
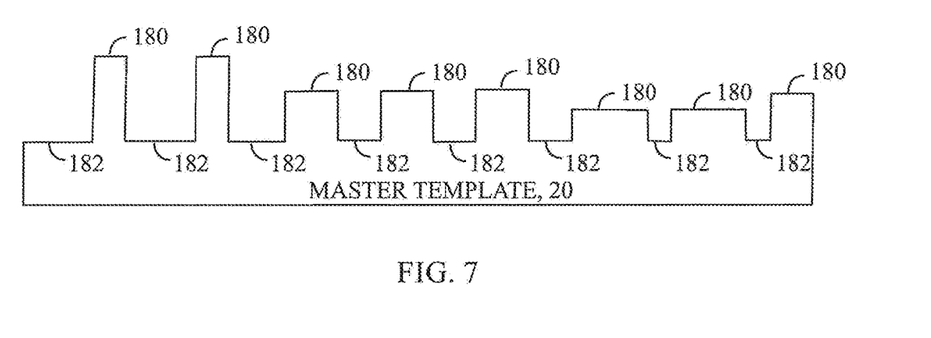
FIG. 7 illustrates an example of a master template with a fill factor and height of raised formations that are inversely proportional with each other.

FIG. 7 illustrates an example of the master template 20 made in the process illustrated in FIGS. 3 to 5. This master template 20 may not be used as the stamp 22 but the master template 20 may be reproduced in order to make the stamp 22. Using the inverse reproduction process, the master template 20 needs to be copied an odd number of times in order to have the stamp 22 which has the fill factor and the height of the raised formations 180 to be directly proportional with each other.

The master template 20 for manufacturing the diffractive optical element has the fill factor and the height of raised formations 180 of the master template 20 that are proportional with each other, and the raised and lowered formations 180, 182 have a determined relation with grooves 902 and ridges 900 of the grating 904.

That the fill factor and the height of raised formations 180 of the master template 20 that are proportional with each other means that the fill factor and the height of the raised formations 180 may be directly proportional with each other or inversely proportional with each other and the they are proportional in a determined manner for modulating the height of the raised formations 180 to compensate the volume differences and alleviating or eliminating the variation of the thickness of the unstructured layer i.e. the residual layer 186 during the inverse replication process.

If the fill factor and the height of raised formations 180 of the master template 20 that are directly proportional with each other, a value of the height of the raised formations 180 increases with increasing value of the fill factor and vice versa. If the fill factor and the height of raised formations 180 of the master template 20 that are directly proportional with each other, a larger value of the height of the raised formations 180 results in a large value of the fill factor and vice versa.

If the fill factor and the height of raised formations 180 of the master template 20 that are inversely proportional with each other, a value of the height of the raised formations 180 decreases with increasing value of the fill factor and vice versa. If the fill factor and the height of raised formations 180 of the master template 20 that are directly proportional with each other, a small value of the height of the raised formations 180 results in a large value of the fill factor and vice versa. A person skilled in the art is familiar with the concept of proportionality. That is, the fill factor and the height of the raised formations 180 may have a same ratio, for example, and/or a change in the fill factor and a change in the height of the raised formations 180 may be similar or opposite. The same ratio may be a constant ratio or the ratio may remain in a predetermined range or the ratio may behave in a predetermined manner for modulating the height of the raised formations 180 to compensate the volume differences. The proportionality also alleviates or eliminates the variation of the thickness of the unstructured layer i.e. the residual layer 186 during the inverse replication process.

In an embodiment, the master template 20 has the fill factor and the height of the raised formations 180 of the master plate 20 that are directly proportional with each other, and the raised formations 180 are configured to cause grooves 902 of the grating 904 and the lowered formations 182 are configured to cause ridges 900 of the grating 904.

In an embodiment, the master template 20 has the fill factor and the height of the raised formations 180 of the master plate 20 that are inversely proportional with each other, and the raised formations 180 are configured to cause ridges 900 of the grating 904 and the lowered formations 182 are configured to cause grooves 900 of the grating 904.

The stamp 22 for manufacturing the diffractive optical element, in turn, has the fill factor and the height of the raised formations 180 of the stamp 22 that are directly proportional with each other, and the raised and lowered formations 180, 182 have a determined relation with grooves 902 and ridges 900 of the grating 904 such that the raised formations 180 are configured to cause grooves 902 of the grating 904 and the lowered formations 182 are configured to cause ridges 900 of the grating 904.

Figure 8:
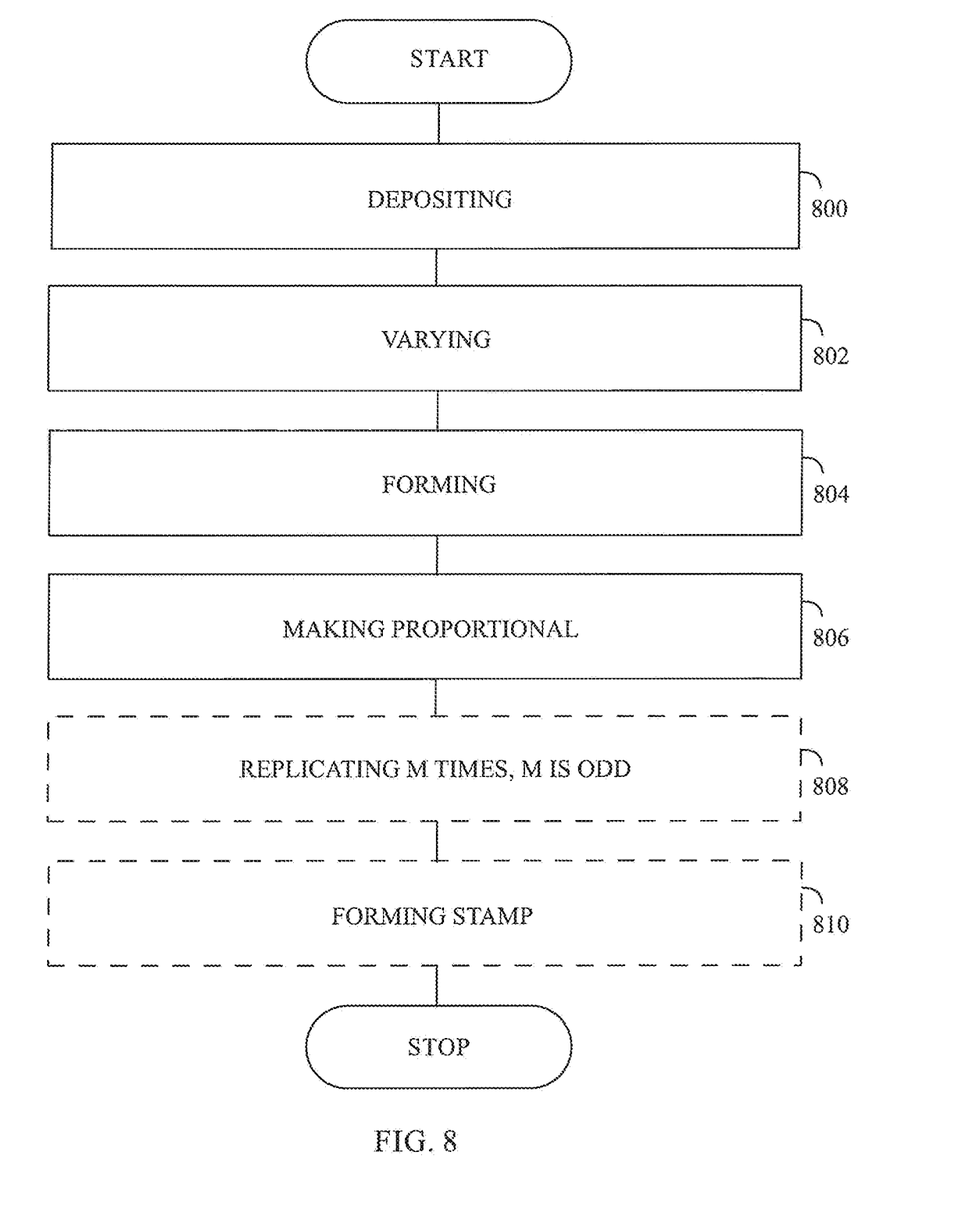
FIG. 8 illustrates an example of a flow chart of a method of manufacturing of the stamp of a grating of an augmented reality eyewear.

FIG. 8 illustrates a method of manufacturing of the stamp 22 of a grating of an augmented reality eyewear. In step 800, depositing, on a substrate 108 of a master template 20, at least one layer 250 of a material 200 through perforations 204 of a plate 202, areas of the perforations 204 depending on locations of the perforations 204 in the plate 202, and the plate 202 and the substrate 108 being spaced at a non-zero distance D from each other.

In step 802, height of the at least one layer 250 on the substrate 106 is caused to vary with variation of the areas of the perforations 204.

In step 804, the raised formations 180 are formed on the substrate 108 by removing the at least one layer 250 from areas, which result in lowered formations 182 between the raised formations 180.

In step 806, a fill factor and a height of the raised formations 180 are made to be proportional with each other while the raised and lowered formations 180, 182 have a relation with grooves 902 and ridges 900 of the grating 904, the relation depending on the proportionality.

In an embodiment, the fill factor and the height of the raised formations 180 are made to be proportional with each other in a determined manner. Then the raised and lowered formations 180, 182 have the correspondingly determined relation with grooves 902 and ridges 900 of the grating 904. The ridge 900 and the groove 902 can be determined such that the grading 904 has a reduced thickness at the groove 902 and at the ridge 900 the grating 904 is thicker than at the groove 904.

The steps 800 to 806 may substantially directly result in the master template 20 or the stamp 22 if the fill factor and the height of the raised formations 180 of the master template 20 or the stamp 22 thus formed are inversely proportional with each other. The steps 800 to 806 may directly result in the master template 20, which needs to be inversely replicated, if the fill factor and the height of the raised formations 180 are directly proportional with each other.

Hence, for forming the stamp 22, either of the following steps 808 and 810 may or have to be performed.

In step 808, the master template 20 is replicated M times based on an inverse replication process, where M is an odd number, in response to the fill factor and the height of the raised formations 180 being inversely proportional with each other. The inverse replication process inverses the profile of the master template such that the raised formations 180 of the master template 20 become lowered formations 182 of the replica and the lowered formations 182 of the master template 20 become raised formations 180 of the replica.

In step 810, the stamp 22 is formed from the master template 20 without a replication process in response to the fill factor and the height of the raised formations 180 being directly proportional with each other, or the master template 20 is replicated N times based on the inverse replication process, where N is an even number, in response to the fill factor and the height of the raised formations 180 being directly proportional with each other.

In an embodiment, the fill factor and the height of the raised formations 180 may be made to be directly proportional with each other. Then the raised formations 180 and the lowered formations 182 may be made to correspond with the grooves 902 and the ridges 900 of the grating 904, respectively.

In an embodiment, the fill factor and the height of the raised formations 180 may be made to be inversely proportional with each other. Then the raised and lowered formations 180, 182 may be made to correspond with the ridges 900 and the grooves 902 of the grating 904, respectively.

In an embodiment, the raised and lowered formations 180 may be copied in an inversed manner for inversing fill factor. Additionally, the height profile may also inverse. The inversed copy of the raised and lowered formations 180, 182 being configured to correspond to distribution and sizes of the grooves 902 and the ridges 900 of the grating 904.

In an embodiment, a copy of the master template 20 may be formed by copying the raised and lowered formations 180 in the inversed manner by pressing the raised and lowered formations 180, 182 of the master template 20 against polymer 184. Then the copy of the master template 20, the copy comprising the polymer 184 with a surface profile that is inversed with respect to the master template 20 may comprise the inversely copied raised and lowered formations 180, 182 of the master template 20. The copy of the master template 20 may be a new master template 20 or a stamp 22.

In an embodiment, depositing of the layer 250 is performed by at least one of the following: sputtering, chemical vapor deposition and physical vapor deposition.

In an embodiment, the raised formations 180 are formed on the substrate 108 by removing the layer 250 of the solid material 200 from the substrate 108 at locations that correspond with locations of the ridges 900 of the grating 904.

In an embodiment, making the height of the layer 250 to vary in two dimensions based on variation of the areas of the perforations 204 in two dimensions.

Figure 9A:
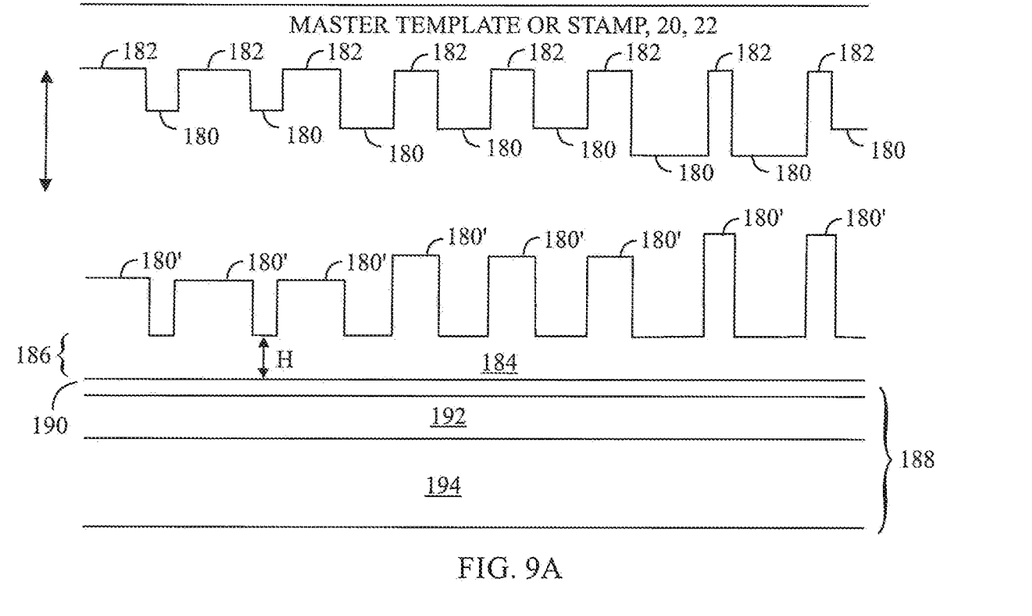
FIG. 9A illustrates an example of a phase of the manufacturing method where the stamp is pressed against a polymer of a preform of the optical component.

FIG. 9A illustrate an example of a phase of the manufacturing method where the stamp 22 is pressed against the polymer 184 of a preform 188 of the diffractive optical element. A grating layer 192 is on a lightguide 194. A hardmask 190, which may be chromium or the like, for example, is on the grating layer 192, and a polymer layer 184 is on the hardmask 190. Layers 184, 190, 192 and 194 form the preform 188 of the diffractive optical element.

A hardmask 190 is an etch mask which is harder than soft mask such as a polymer mask. Material of the hardmask 190 may be chromium, for example. The hardmask 190 prevents the removal process of the residual layer 186 from advancing to the grading layer 192 and causing harm to it.

The stamp 22, which has the fill factor and the height of the raised formations 180 directly proportional with each other, is pressed against the polymer layer 184 for making the fill factor and the height of the elevated formations 180' of the polymer 184 to be inversely proportional with each other. The stamp 22 may be a copy of the master template 20 or it may be the master template 20. The height H of the residual layer 186 is substantially constant because the polymer 184 can distribute according to the stamp 22.

Figure 9B:
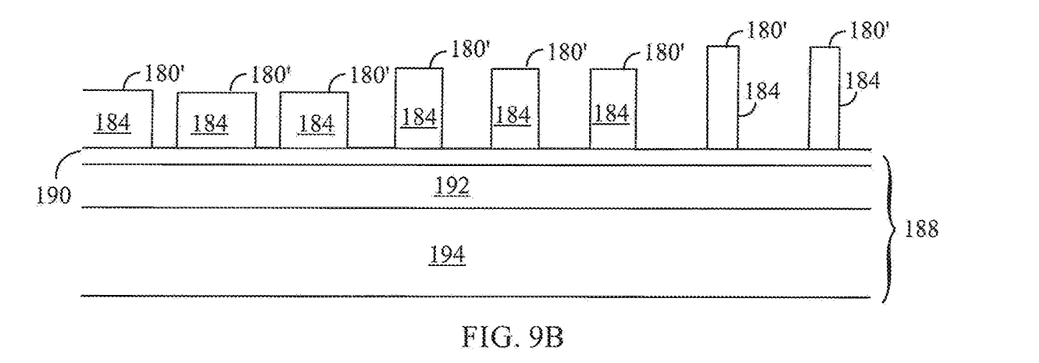
FIG. 9B illustrates an example of a layer of the polymer on a hardmask of the preform of the optical component after a residual layer is removed.

FIG. 9B illustrates an example where the residual layer 186 is removed from between the elevated formations 180'.

In an embodiment, the removal of the residual layer 186 may be performed by etching. The etching may include reactive ion etching (RIE), for example.

Figure 9C:
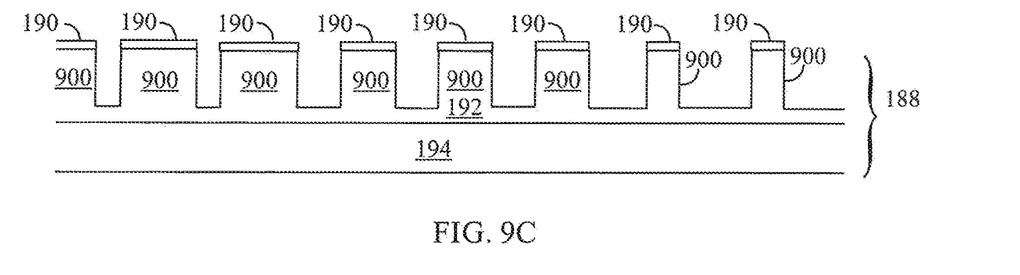
FIG. 9C illustrates an example of grading with hardmask.

FIG. 9C illustrates an example where ridges 900 are formed to a grating layer 192 by removing the hardmask 190 between the elevated formations 180' of the polymer 184, the ridges 900 thus remaining in the locations of the elevated formations 180'. In FIG. 9C, the hardmask 190 is still shown to be on the top of ridges 900, while the polymer 184 has already been removed. In an embodiment, the ridges 900 of the grating layer 192 may be performed by etching. In an embodiment, the grating layer 192 may have height variation, the height being a function of location in a manner similar to that of the layer 250 (see FIGS. 4B to 5).

Figure 9D:
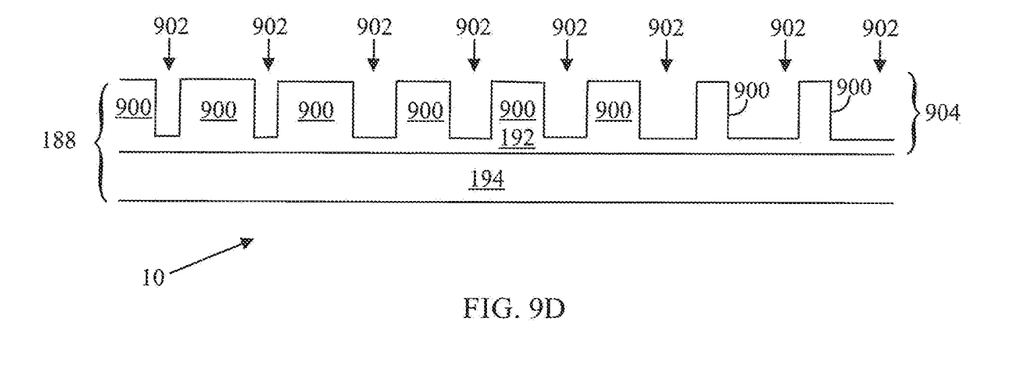
FIG. 9D illustrates an example of the grading after removal of the hardmask.

FIG. 9D illustrates an example where the hardmask 190 has been removed from the top of the ridges 900 of the grating and a final form of the grating 100, 102, 104 of the diffractive optical element (marked in this example with reference number 10) is approaching its final form or the final form is already reached. The hardmask may be removed with one or more suitable acids, which are known, per se, by a person skilled in the art. Additionally or alternatively, may be wet etched. Still additionally or alternatively, the hardmask may be dry etched, for example.

Figure 10:
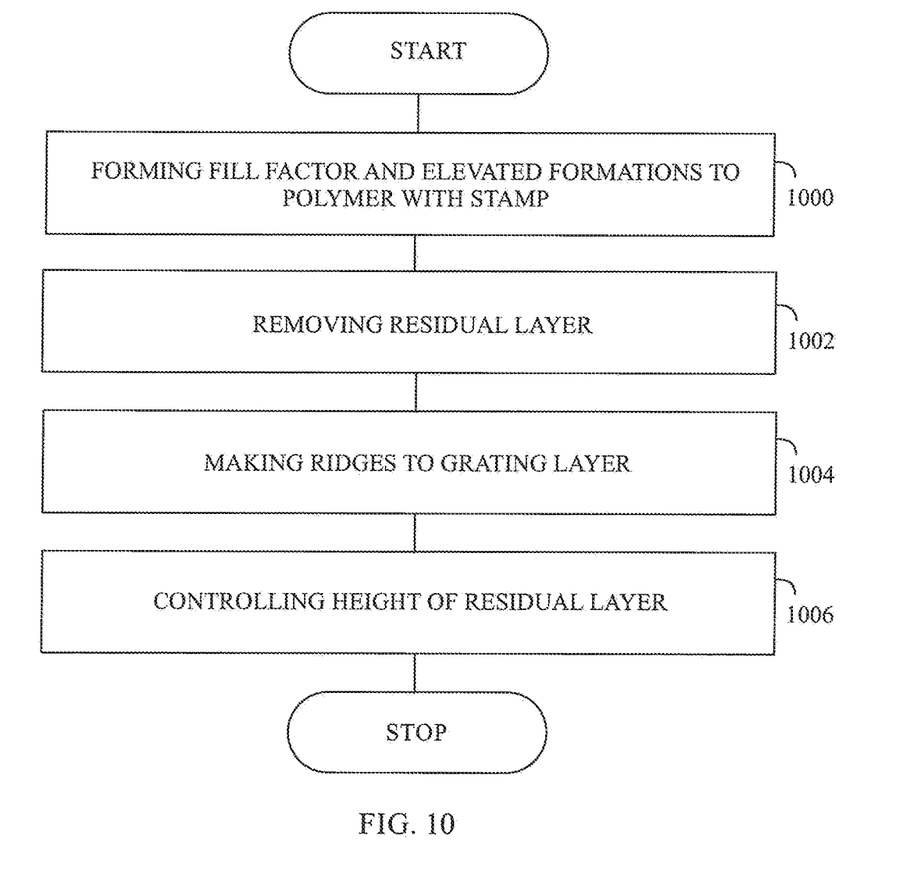
FIG. 10 illustrates of an example of a flow chart of a method of manufacturing the optical component.

FIG. 10 illustrate an example of a manufacturing method of an optical grating element 100, 102, 104 of an augmented reality eyewear.

In step 1000, a fill factor and height of the elevated formations 180' are formed to a polymer 184 on a hardmask 190 of a preform 188 of the diffractive optical element with a stamp 22 having a fill factor and height of the raised formations 180 directly proportional with each other, the fill factor and the height of the elevated formations 180' of the preform 188 being inverse to that of the stamp 22.

In step 1002, a residual layer 186 is removed from between the elevated formations 180'.

In step 1004, ridges 900 are made to a grating layer 192, which is on a lightguide 194 of the preform 188, the ridges 900 resulting in at locations corresponding to locations of the lowered formations 182 of the stamp 22. [vt 10]

In step 1006, which may be optional, the stamp 22 may control height of the residual layer 186 of the polymer 184. In an embodiment, the stamp 22 may cause the residual layer 186 of the polymer 184 to have a substantially constant height based on the fill factor with stamp 22 and the height of the raised formations 180 of the stamp 22 that are directly proportional with each other. In an embodiment, the stamp 22 may cause the residual layer 186 of the polymer 184 to vary in a determined manner, the variation depending on the proportionality.

In this manner, the raised formations 180 of the stamp 22 displace a volume of the polymer 184 at locations under the raised formations 180. The displaced volume of the polymer 184 is related to the size of the raised formations 180. The displaced polymer 184 moves/flows sideways to locations that are under the lowered formations 182 of the stamp 22, the locations under the lowered formations 182 becoming the residual layer 186 of the polymer 184. Hence, the locations under the lowered formations 182 can be filled in a desired manner such that the residual layer 186 has a constant height or the height follows a predetermined variation.

Realization of such a controllable thickness modulation of the structured master template 20 and the stamp 22 allows at least two benefits in replication of diffractive optical elements (DOE) used as optical combiners in Augmented Reality (AR) eyewear, for example. The benefits are as follows: i) height modulation is required to compensate the volumetric differences that different feature sizes in the replicated structures require, ii) the height modulation can be used directly to transfer the height modulated pattern to a replicated sample.

Whereas the first benefit is related to the reliability and simplicity of the mastering and replication processes, the latter one can be used to improve the performance of the fabricated DOE with modulated height.

It will be obvious to a person skilled in the art that, as technology advances, the inventive concept can be implemented in various ways. The invention and its embodiments are not limited to the example embodiments described above but may vary within the scope of the claims.

The invention claimed is:

1. A manufacturing method of a master template of a grating of a diffractive optic element, the method comprising:
   depositing on a hardmask of a substrate of the master template, at least one layer of material through perforations of a plate, cross sectional areas of the perforations depending on locations of the perforations in the plate, and the plate and the substrate being spaced at a non-zero distance (D) from each other;
   causing a height of the at least one layer on the substrate to vary with variation of the areas of the perforations;
   forming raised formations on the substrate by removing the at least one layer from areas, which result in lowered formations between the raised formations, while the hardmask protects the substrate and a grating layer of the substrate when the at least one layer is removed for forming the lowered formations; and
   making a fill factor and height of the raised formations to be proportional with each other while the raised and lowered formations have a relation with grooves and ridges of the grating, the relation depending on the proportionality.

2. The method of claim 1, comprising:
   making the fill factor and the height of the raised formations to be directly proportional with each other; and
   making the raised formations and the lowered formations to correspond with the grooves and the ridges of the grating, respectively.

3. The method of claim 1, comprising
   making the fill factor and the height of the raised formations to be inversely proportional with each other;
   making the raised and lowered formations to correspond with the ridges and the grooves of the grating, respectively.

4. The method of claim 2, comprising copying the raised and lowered formations in an inversed manner for inversing the height profile and fill factor, and the inversed copy of the raised and lowered formations being configured to correspond to distribution and sizes of the grooves and the ridges of the grating.

5. The method of claim 4, comprising forming a copy of the master template by copying the raised and lowered formations in the inversed manner by pressing the raised and lowered formations of the master template against polymer; and making the copy of the master template to comprise the inversely copied raised and lowered formations of the master template.

6. The manufacturing method of claim 1, comprising performing depositing of the layer by at least one of the following: sputtering, chemical vapor deposition and physical vapor deposition.

7. The manufacturing method of claim 1, comprising forming the raised formations on the substrate by removing solid material of the layer from the substrate at locations that correspond with locations of the ridges of the grating.

8. The manufacturing method of claim 1, comprising making the height of the layer to vary in two dimensions based on corresponding variation of the areas of the perforations in two dimensions.

9. A manufacturing method of a stamp of a grating of a diffractive optic element, comprising:
   making a master template by:
      depositing, on a hardmask of a substrate of the template, at least one layer of a material through perforations of a plate, cross sectional areas of the perforations depending on locations of the perforations in the plate, and the plate and the substrate being spaced at a non-zero distance from each other;
      causing a height of the at least one layer on the substrate to vary with variation of the cross sectional areas of the perforations;
      forming raised formations on the substrate by removing the at least one layer from areas, which result in lowered formations between the raised formations, while the hardmask protects the substrate and grating layer of the substrate when the at least one layer is removed for forming the lowered formations;
      making a fill factor and a height of the raised formations to be proportional with each other while the raised and lowered formations have a relation with grooves and ridges of the grating, the relation depending on the proportionality; and
   making the stamp by:
      replicating the master template M times based on a profile inversing process, where M is an odd number, in response to the fill factor and the height of the raised formations being inversely proportional with each other,
      forming the stamp from the master template in response to the fill factor and the height of the raised formations being directly proportional with each other, or
      replicating the master template N times based on a profile inversing process, where N is an even number, in response to the fill factor and the height of the raised formations being directly proportional with each other.

10. A manufacturing method of a diffractive optic element, the method comprising:
   providing a substrate having a lightguide, grating layer, hardmask layer and polymer layer;
   forming, with a stamp manufactured according to claim 9 and having the fill factor and the height of the raised formations directly proportional with each other, a fill factor and height of elevated formations to the polymer layer, the fill factor and the height of the elevated formations of the polymer layer being inverse to the fill factor and the height of the raised formations of the stamp;
   removing material from the polymer layer from between the elevated formations; and
   making ridges to the grating layer, which is on the lightguide of the substrate, the ridges at locations corresponding to locations of the lowered formations of the stamp to provide the diffractive optic element.

11. The method of claim 10, comprising causing the elevated formations of the polymer layer to have a substantially constant height based on the fill factor with the stamp and the height of the raised formations of the stamp that are directly proportional with each other.

* * * * *